US007619507B2

(12) United States Patent
Santos et al.

(10) Patent No.: US 7,619,507 B2
(45) Date of Patent: Nov. 17, 2009

(54) SYSTEM AND METHOD FOR RECEIVING INFORMATION IN A VEHICLE

(75) Inventors: Sergio Santos, Belleville, MI (US); Mounir Hider, Dearborn Hts, MI (US)

(73) Assignee: Ford Motor Company, Dearborn, MI (US)

( * ) Notice: Subject to any disclaimer, the term of this patent is extended or adjusted under 35 U.S.C. 154(b) by 261 days.

(21) Appl. No.: 11/383,811

(22) Filed: May 17, 2006

(65) Prior Publication Data

US 2007/0268156 A1 Nov. 22, 2007

(51) Int. Cl.
*B60Q 1/00* (2006.01)

(52) U.S. Cl. ...................................................... 340/438

(58) Field of Classification Search ................. 340/438, 340/992, 995.13, 539.13, 384.1, 905; 701/1; 455/456.1

See application file for complete search history.

(56) References Cited

U.S. PATENT DOCUMENTS 6,292,747 B1 9/2001 Amro et al.
6,590,507 B2 * 7/2003 Burns .................... 340/995.13
6,690,940 B1 * 2/2004 Brown et al. ............. 455/456.4
6,748,237 B1 6/2004 Bates et al.
6,868,331 B2 * 3/2005 Hanebrink .................. 701/117
7,089,116 B2 * 8/2006 Smith ............................ 702/3
7,193,528 B2 * 3/2007 Hanebrink .................. 340/907
7,269,505 B2 * 9/2007 Zhao et al. .................. 701/201
2003/0231163 A1 12/2003 Hanon et al.
2004/0003048 A1 * 1/2004 Stillman et al. ............. 709/207
2004/0010366 A1 1/2004 Videtich
2005/0033504 A1 * 2/2005 Rennels ...................... 701/117
2005/0216184 A1 9/2005 Ehlers
2005/0259606 A1 * 11/2005 Shutter et al. ............... 370/317
2005/0273255 A1 12/2005 Watkins et al.
2007/0083673 A1 * 4/2007 Lara et al. ................... 709/246

FOREIGN PATENT DOCUMENTS

EP 0725500 A3 8/1996
EP 1113602 A3 7/2001
GB 2382504 A 5/2003
WO 2006/087318 A1 8/2006
WO 2007/038355 A1 4/2007

* cited by examiner

*Primary Examiner*—Phung Nguyen
(74) *Attorney, Agent, or Firm*—Jennifer Stec; Brooks Kushman P.C.

(57) ABSTRACT

Aspects of the invention provide a system and method for receiving information in a vehicle. Information pertaining to the vehicle's driver may be stored. Information pertaining to the vehicle's driver may be made audile through the vehicle's radio system.

11 Claims, 3 Drawing Sheets

SYSTEM AND METHOD FOR RECEIVING INFORMATION IN A VEHICLE

BACKGROUND OF THE INVENTION

1. Field of the Invention

The invention relates to a system and method for receiving information in a vehicle.

2. Background Art

Certain systems provide information to drivers of vehicles for a general geographic area. The information may or may not be of interest to the drivers. For example, traffic information may be provided for a city and its surrounding suburbs. A driver, however, may not be interested in the traffic information for the suburbs because their driving is limited to the city.

Other systems attempt to provide information that is tailored to the route a driver is traveling. These systems may include global positioning satellite technology to determine vehicle position data. These systems may also include telematics capabilities to communicate the vehicle position data. The vehicle position data may be used to facilitate the delivery of information tailored to the route a driver is traveling. Global positioning satellite technology and telematics capabilities, however, may be cost prohibitive for certain drivers.

Still other systems provide, for example, weather information continuously via a dedicated data channel. As the weather changes, the weather information is updated. These systems, however, may not indicate when the weather information has been updated. A driver may need to frequently listen to the dedicated data channel in order to determine whether the weather information has been updated.

Background information may be found in U.S. Patent Application Publication Nos. 2003/0231163 A1, 2004/0010366 A1, 2005/0033504 A1, 2005/0216184 A1, 2005/0259606 A1, and 2005/0273255 A1.

A cost effective system and method for receiving information of interest to a driver of a vehicle is desired.

SUMMARY OF THE INVENTION

An embodiment of the invention provides for the audible delivery of information that is of interest to a driver, or user. The information may be weather information, financial information, or any other type of information. For example, while driving, an audible prompt saying "There is traffic alert information, would you like to listen to it?" would automatically be heard by the user. If the user decides they would like to hear the traffic alert information, they would press a button in response to the audible prompt. The user then listens to the traffic alert information.

An embodiment of the invention provides for the customization of information. The information may be customized by any suitable criteria. Financial information, for example, may be limited to financial information relevant to a particular country.

The information heard by the user may also be limited, for example, to information that is relevant to a geographic area defined by a radius and zip code.

When the vehicle is purchased, the zip code may be the zip code of the dealer from which the vehicle is purchased. The radius may be a default radius of, for example, fifteen miles. The user, however, may customize the zip code and radius data by submitting data via a website or other data channel. The data will then be packaged and broadcast with a unique broadcast identification number that only the user's vehicle will download and store.

The broadcast identification number may be a twelve digit electronic serial number that is associated with the user's data and the user's vehicle. A downlink processor (DLP) within the vehicle will process the information and apply criteria to decide whether the broadcast information is relevant. The DLP will decide whether or not it has received relevant information, for example, from the user regarding the zip code and radius by referencing the electronic serial number of the vehicle and the electronic serial number embedded in the information received.

If the DLP decides that it has received relevant information, the DLP stores the updated data regarding the zip code and radius in its memory. If the DLP decides that it has not received relevant information, the DLP does not store the updated data regarding the zip code and radius.

The DLP will also parse through the information and apply the most current criteria in order to determine whether the information received is relevant to the user. The information that the DLP determines relevant is stored in the memory of the DLP so that the most current information is always available.

An embodiment of the invention provides for a text-to-speech processor. The text-to-speech processor in combination with the vehicle's speaker system will allow the user to hear relevant information.

An embodiment of the invention provides alert information that is collected from sources such as the Department of Transportation or private companies engaged in the gathering and sending of information. Once gathered, the information is sent using a predefined protocol via the internet to a central hub. The central hub converts the information from an internet protocol to a satellite protocol and broadcasts it.

An embodiment of the invention provides information aggregated by aggregating companies. This information is sent to a satellite radio service. The satellite radio service packages the information and broadcasts it to vehicles within a number of markets via a data channel.

A driver may select the market, e.g., city or country, for which they would like information. Application code will extract the pertinent information based on the driver's selected market.

Alerts will be presented to the driver in one of several ways. The driver may hear an audible beep to indicate, for example, that incidents have occurred in the market selected by the driver. The driver will then, if interested in hearing the incident, press a predefined button or buttons to hear the incidents. Incidents will be parsed from the satellite broadcast and played by a text-to-speech engine.

The driver may instead directly hear the incidents when they becomes available without needing to press any buttons. The incidents will be played via radio speakers installed in the vehicle. If the driver is listening to the radio when updated incidents become available, the radio will be interrupted while the incident is read via the text-to-speech engine.

An aspect of the invention provides a method for receiving information in a vehicle. The method includes storing information about a user-defined criteria and receiving a broadcast signal containing information. The method also includes processing the signal to determine whether at least a portion of the information pertains to the user-defined criteria. The method further includes automatically generating an audible signal when at least a portion of the information pertains to the user-defined criteria.

The method may include receiving a user input signal in response to the audible signal.

The audible signal may be an audible alert signal.

The method may include generating an audible information signal containing at least a portion of the information pertaining to the user-defined criteria.

The method may include storing at least a portion of the information pertaining to the user-defined criteria.

The method may include generating an audible information signal containing the stored information.

The audible information signal may be a voice signal.

An aspect of the invention provides a method for receiving event information in a vehicle. The method includes storing information about an identification number unique to the vehicle. The method also includes receiving a broadcast signal containing information about a user-defined geographic region and receiving a broadcast signal containing event information including a geographic location associated with an event. The method further includes processing the signal containing the event information to determine whether at least a portion of the event information pertains to the user-defined geographic region and storing at least a portion of the event information pertaining to the user-defined geographic region. The method still further includes automatically generating an audible signal when at least a portion of the event information pertains to the user-defined geographic region.

The audible signal may be an audible alert signal.

The method may include, after the step of automatically generating an audible signal, receiving a user input signal in response to the audible signal.

The method may include, after the step of receiving a user input signal, generating an audible information signal containing the stored event information.

The method may include, after the step of receiving a user input signal, generating an audible information signal containing the event information pertaining to the user-defined geographic region.

The method may include, after the step of automatically generating an audible signal, automatically generating an audible information signal containing the stored event information.

The audible information signal may be a voice signal.

The broadcast signal containing the information about the user-defined geographic region may include a broadcast identification number.

The method may include processing the signal containing the information about the user-defined geographic region to determine whether the broadcast identification number matches the identification number unique to the vehicle.

The method may include storing the information about the user-defined geographic region when the broadcast identification number matches the identification number unique to the vehicle.

The information about the user-defined geographic region may include a user-defined zip code.

The event information may include a zip code associated with the event.

The method may include determining whether the zip code associated with the event is located within a predetermined radius of the user-defined zip code.

The information about the user-defined geographic region may include a user-defined zip code.

The event information may include a latitude and a longitude associated with the event.

The method may include converting the latitude and the longitude associated with the event into a zip code associated with the event.

An aspect of the invention provides a system for receiving event information in a vehicle. The system includes a receiver configured to receive a broadcast signal containing event information including a geographic location associated with an event. The system also includes a processor. The processor is configured to store information about an identification number unique to the vehicle and store information about a user-defined geographic region. The processor is also configured to process the broadcast signal to determine whether at least a portion of the event information pertains to the user-defined geographic region and store at least a portion of the event information pertaining to the user-defined geographic region. The processor is further configured to automatically generate a signal capable of being made audible when at least a portion of the event information pertains to the user-defined geographic region.

The receiver may be configured to receive a broadcast signal containing information about a user-defined geographic region including a broadcast identification number.

The processor may be configured to process the signal containing the information about the user-defined geographic region to determine whether the identification number unique to the vehicle matches the broadcast identification number.

The processor may be configured to store the information about the user-defined geographic region when the identification number unique to the vehicle matches the broadcast identification number.

The signal capable of being made audible may be an alert signal.

The processor may be configured to automatically generate an information signal containing the stored event information.

The information signal may be capable of being made audible.

The invention may enhance a user's ability to receive information via standard radio equipment.

The above aspects and other aspects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
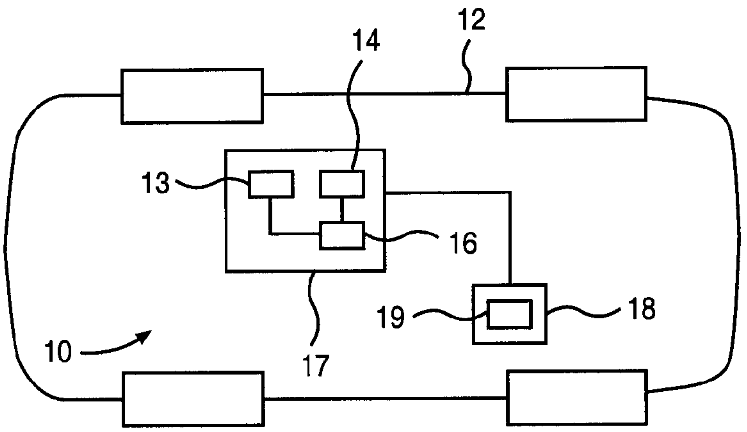
FIG. 1 shows a block diagram of a system of the present invention.

FIG. 1 is a block diagram of a system 10 for receiving information in a vehicle 12. The system 10 includes memory 13, such as electronically erasable and programable read only memory (EEPROM), a receiver 14, and a processor 16. The memory 13, receiver 14, and processor 16 reside in the module 17, or downlink processor (DLP). The memory 13, receiver 14 and processor 16, however, may reside in separate modules. The system 10 also includes a radio system 18 that includes a speaker 19.

The processor 16 is electrically connected to the memory 13 and the receiver 14. The downlink processor 17 is connected to the radio system 18 via a network link, such as car area network (CAN), and audio circuitry. The audio circuitry provides audio capability in an analog format.

The receiver 14 is configured to receive a broadcast signal containing information about a user-defined geographic region. The information includes a broadcast identification number.

The broadcast signal is a satellite signal. The broadcast signal, however, may be of other types.

The information about a user-defined geographic region includes a zip code and radius defining the geographic area for which a user is interested in hearing information. Other criteria, such as an area defined by a set of latitude and longitude coordinates, may also be used.

The broadcast identification number is a number unique to the user's particular vehicle 12 and matches the vehicle's identification or electronic serial number. The broadcast identification number is used by the processor 16 to determine whether certain broadcast information pertains to the vehicle 12 as will be explained below in detail.

The user can update the information about their user-defined geographic region via a website or other data channel that is in communication with a central data hub. For example, a user may wish to change the zip code from a default zip code set by the vehicle dealer or manufacturing facility. The user includes their broadcast identification number along with their updated information. Before broadcasting the information, the central data hub packages the broadcast identification number with the updated information. A vehicle receiving the broadcast information can use the broadcast identification number to determine whether to download and store the updated information as will be explained below in detail.

The receiver 14 is also configured to receive a broadcast signal containing information. The information includes a geographic location associated with an event.

The broadcast signal is a satellite signal. The broadcast signal, however, may be of other types.

The information, for example, includes information about one or more incidents, e.g., traffic events, in different locations. The location of particular incidents is indicated by a zip code or a latitude and longitude. Other geographic indicators, however, may be used.

A set of incident data for a particular location is packaged and broadcast by location sequentially. For example, traffic event information associated with a particular zip code may be packaged and broadcast followed by traffic event information for a different zip code.

The processor 16 is configured to store an identification number unique to the vehicle, e.g., an electronic serial number. This identification number may be input during manufacturing via a physical data link or wireless transmission. The electronic serial number is stored in memory 13.

The processor 16 is also configured to store information about a user-defined geographic region. This information may come from a dealer, manufacturer, or vehicle user. For example, after the vehicle 12 is manufactured, a dealer may input a default geographic region to the DLP 17 via a physical data link or a wireless transmission. The default geographic region may be the zip code in which the dealer is located. As explained above, a user may also update the geographic region information. The information about a user-defined geographic region is stored in memory 13.

The processor 16 is also configured to process the signal containing the information to determine whether at least a portion of the information pertains to the user-defined geographic region.

The processor 16 determines, for example, whether the zip code associated with a set of traffic event information falls within the specified radius of the user-defined zip code. If it does, the traffic event information pertains to the user-defined geographic region. If it does not, the traffic event information does not pertain to the user-defined geographic region.

The processor 16 is also configured to store at least a portion of the event information pertaining to the user-defined desired geographic region. As the processor 16 parses through the event information and determines whether a given event pertains to the user-defined geographic region, the processor 16 is configured to store one or more events pertaining to the user-defined geographic region. The event information is stored in memory 13.

The processor 16 is also configured to automatically generate a signal capable of being made audible when at least a portion of the information pertains to the user. The signal is forwarded from the DLP 17 via the audio circuitry to the radio system 18. The signal is then played by the speaker 19. The signal may also include a non-audio component, such as information for text or an icon, to be displayed on a display screen. The non-audio component of the signal may be sent over the network link or through a wireless transmission.

The processor 16 is further configured to process the signal containing the information about the user-defined geographic region, or other criteria, to determine whether the identification number unique to the vehicle matches the broadcast identification number. The processor 16 thus determines whether the information about the user-defined geographic region pertains to the vehicle 12. If the broadcast identification number matches the identification number unique to the vehicle the information about the user-defined geographic region pertains to the vehicle 12. If the broadcast identification number does not match the identification number unique to the vehicle, the information about the user-defined geographic region does not pertain to the vehicle 12.

The processor 16 is still further configured to store the information about the user-defined geographic region when the identification number unique to the vehicle matches the broadcast identification number. The information is stored in memory 13.

The processor 16 is further configured to automatically generate an information signal capable of being made audible by, for example, the speaker 19, containing the stored information. The signal is forwarded from the DLP 17 via the audio circuitry to the radio system 18. The signal is then played by the speaker 19. The signal may also include a non-audio component, such as information for text or an icon, to be displayed on a display screen. The non-audio component of the signal may be sent over the network link or through a wireless transmission.

Figure 2:
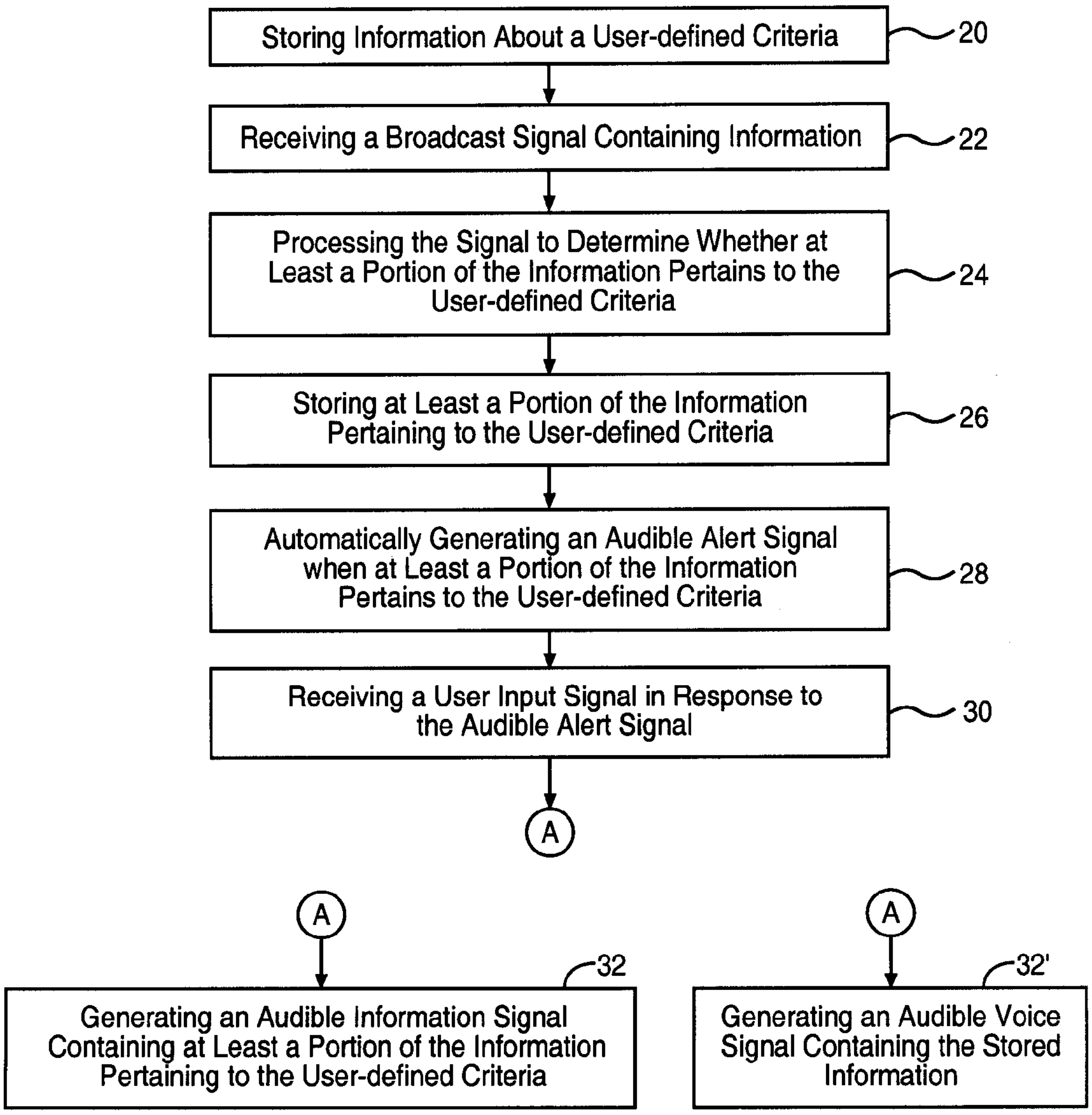
FIG. 2 shows a flow chart of a method of the present invention.

FIG. 2 is a flow chart of a method for receiving information in a vehicle 12 in accordance with an embodiment of the invention.

At step 20, a processor 16 (FIG. 1) stores information about a user-defined criteria.

At step 22, a receiver 14 (FIG. 1) receives a broadcast signal containing information. The information, for example, may be financial information or weather information.

At 24, the processor 16 (FIG. 1) processes the signal to determine whether at least a portion of the information pertains to the user-defined criteria.

At step 26, the processor 16 (FIG. 1) stores at least a portion of the information pertaining to the user-defined criteria.

At step 28, the processor 16 (FIG. 1) and speaker 19 (FIG. 1) automatically generate an audible signal when at least a portion of the information pertains to the user-defined criteria. The audible signal may be a beep or a simulated voice that alerts the user that information is available.

At step 30, the processor 16 (FIG. 1) receives a user input signal in response to the audible alert signal. When the user wants to hear the information, the user pushes a button, for example, located on a console assembly or the steering wheel.

At step 32, the processor 16 (FIG. 1) and speaker 19 (FIG. 1) generate an audible information signal containing at least a portion of the information pertaining to the user-defined criteria.

As an alternative to step 32, at step 32', the processor 16 (FIG. 1) and speaker 19 (FIG. 1) generate, using a text-to-speech processor, an audible voice signal containing the stored information.

Figure 3:
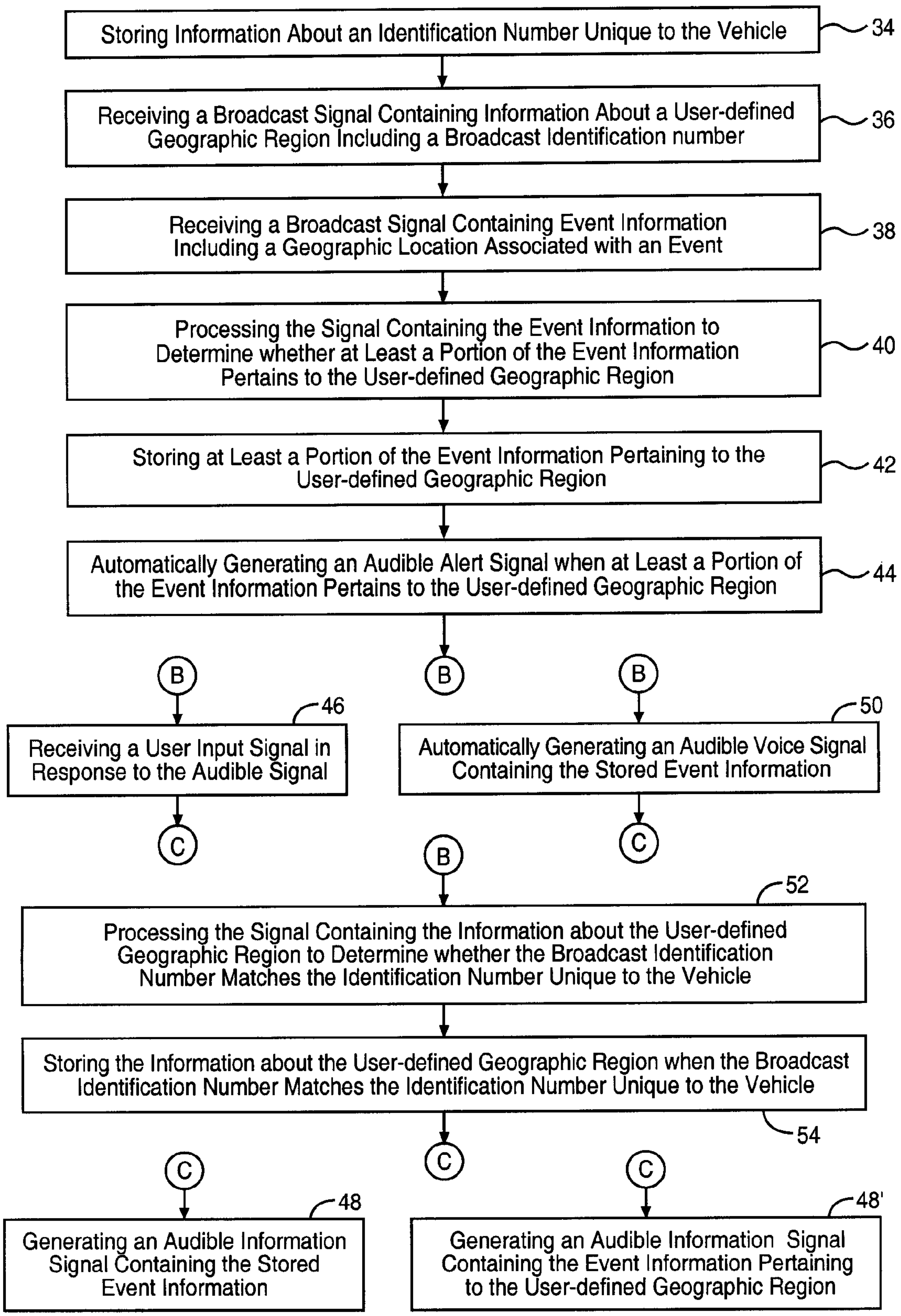
FIG. 3 shows a flow chart of a method of the present invention.

FIG. 3 is a flow chart of another method for receiving information in a vehicle 12 in accordance with an embodiment of the invention.

At step 34, the processor 16 (FIG. 1) stores information about an identification number unique to the vehicle.

At step 36, the receiver 14 (FIG. 1) receives a broadcast signal containing information about a user-defined geographic region including a broadcast identification number.

At step 38, the receiver 14 (FIG. 1) receives a broadcast signal containing event information including a geographic location associated with an event. The event information may be, for example, traffic event information or political event information, such as a localized election. The event information, however, may be any information that has some bearing on a geographic location.

At step 40, the processor 16 (FIG. 1) processes the signal containing the event information to determine whether at least a portion of the event information pertains to the user-defined geographic region.

Figure 3A:
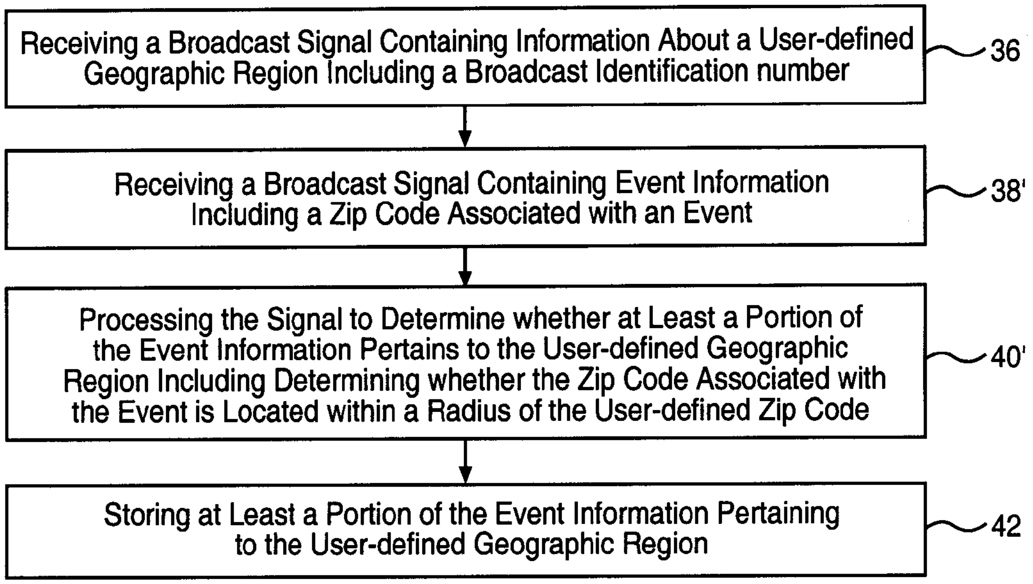
FIG. 3*a* shows a flow chart of an alternative portion of the method of FIG. 3.

FIG. 3*a* shows a portion of the flow chart of the method of FIG. 3 with alternative steps 38' and 40'.

The location of particular events may be indicated by a zip code, as shown in alternative step 38'. Other criteria, however, may be used.

When the location of particular events is indicated by a zip code, as shown in step 38', at step 40', the processor 16 (FIG. 1) processes the signal to determine whether at least a portion of the event information pertains to the user-defined geographic by determining whether the zip code associated with the event is located within a predetermined radius, e.g., ten miles, of the user-defined zip code. If the zip code is located within the predetermined radius of the user-defined zip code, the event information pertains to the user-defined geographic region. If the zip code is not located within the predetermined radius of the user-defined zip code, the event information does not pertain to the user-defined geographic region.

Figure 3B:
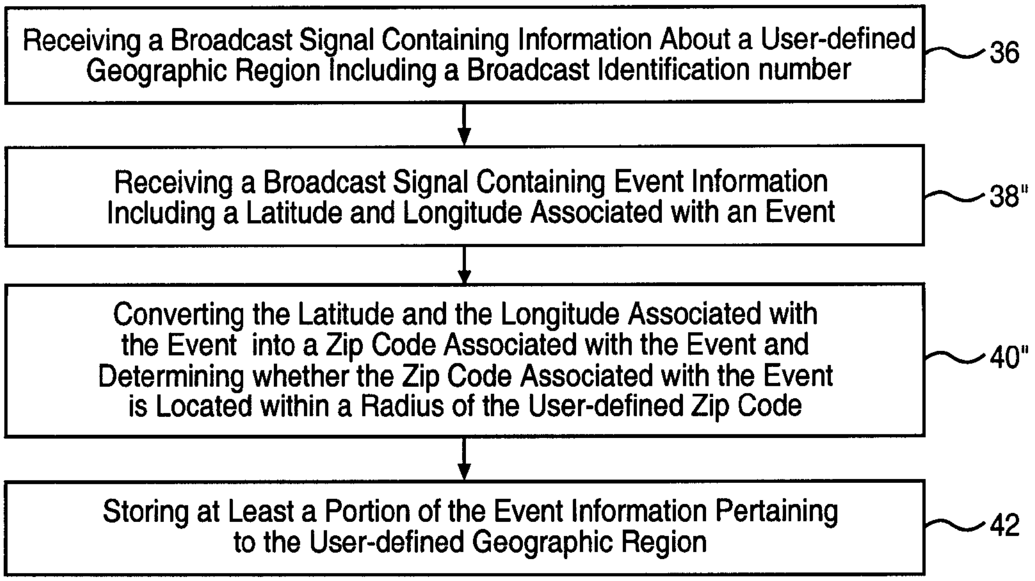
FIG. 3*b* shows a flow chart of an alternative portion of the method of FIG. 3.

FIG. 3*b* shows a portion of the flow chart of the method of FIG. 3 with alternative steps 38" and 40".

The location of particular events may be indicated by a latitude and longitude, as shown in yet another alternative step 38".

When the location of particular events is indicated by a latitude and longitude, as shown in step 38", at step 40", the processor 16 (FIG. 1) converts the latitude and the longitude associated with the event into a zip code associated with the event and determines whether the zip code associated with the event is located within a predetermined radius, e.g., ten miles, of the user-defined zip code.

The processor 16 (FIG. 1) uses a look-up table to convert the latitude and the longitude coordinates into a zip code. Other conversion processes, however, may also be used.

If the zip code is located within the predetermined radius of the user-defined zip code, the event information pertains to the user-defined geographic region. If the zip code is not located within the predetermined radius of the user-defined zip code, the event information does not pertain to the user-defined geographic region.

Referring to FIG. 3, at step 42, the processor 16 (FIG. 1) stores at least a portion of the event information pertaining to the user-defined geographic region.

At step 44, the processor 16 (FIG. 1) and speaker 19 (FIG. 1) automatically generate an audible alert signal when at least a portion of the event information pertains to the user-defined geographic region. The audible signal may be a beep or a simulated voice that alerts the user that event information is available.

At step 46, the processor 16 (FIG. 1) receives a user input signal in response to the audible alert signal of step 44. When the user wants to hear the event information, the user pushes a button, for example, located on a console assembly or the steering wheel.

At step 48, the processor 16 (FIG. 1) and speaker 19 (FIG. 1) generate an audible information signal containing the stored event information.

As an alternative to step 48, at step 48', the processor 16 (FIG. 1) and the speaker 19 (FIG. 1) generate an audible information signal containing the event information pertaining to the user-defined geographic region.

As an alternative to step 46, at step 50, the processor 16 (FIG. 1) and speaker 19 (FIG. 1) automatically generate an audible voice signal containing the stored event information. The user does not have to physically respond to the alert signal of step 44 in order to hear the event information stored at step 42. Rather, the user automatically hears the event information stored at step 42.

As another alterative to step 46, at step 52, the processor 16 (FIG. 1) processes the signal containing the information about the user-defined geographic region to determine whether the broadcast identification number matches the identification number unique to the vehicle.

At step 54, the processor 16 (FIG. 1) stores the information about the user-defined geographic region when the broadcast identification number matches the identification number unique to the vehicle.

While the best mode for carrying out the invention has been described in detail, those familiar with the art to which this invention relates will recognize various alternative designs and embodiments for practicing the invention as defined by the following claims.

What is claimed:

1. A method for receiving information in a vehicle comprising:

storing information about a user-defined criteria;

receiving a broadcast signal containing event information;

determining whether the event information pertains to the user-defined criteria;

storing the event information if the event information pertains to the user-defined criteria;

automatically generating an alert signal if the event information pertains to the user-defined criteria; and at least one of playing and displaying the stored event information.

2. The method of claim 1 further comprising receiving a user input in response to the alert signal.

3. A method for receiving event information in a vehicle comprising:

storing information about an identification number unique to the vehicle;

receiving a broadcast signal containing information about a user-defined geographic region;

receiving a broadcast signal containing event information including a geographic location associated with an event;

determining whether at least a portion of the event information pertains to the user-defined geographic region;

storing at least a portion of the event information pertaining to the user-defined geographic region;

automatically generating an audible signal when at least a portion of the event information pertains to the user-defined geographic region;

at least one of playing and displaying the stored event information.

4. The method of claim 3 wherein the audible signal is an audible alert signal and the method further comprises, after the step of automatically generating an audible signal, receiving a user input signal in response to the audible signal.

5. The method of claim 3 wherein the broadcast signal containing the information about the user-defined geographic region includes a broadcast identification number, the method further comprising determining whether the broadcast identification number matches the identification number unique to the vehicle thereby determining whether the information about the user-defined geographic region pertains to the vehicle and storing the information about the user-defined geographic region when the broadcast identification number matches the identification number unique to the vehicle.

6. The method of claim 3 wherein the information about the user-defined geographic region includes a user-defined zip code and wherein the event information includes a zip code associated with the event.

7. The method of claim 6 wherein the step of determining whether at least a portion of the event information pertains to the user-defined geographic region includes determining whether the zip code associated with the event is located within a predetermined radius of the user-defined zip code.

8. The method of claim 3 wherein the information about the user-defined geographic region includes a user-defined zip code and wherein the event information includes a latitude and a longitude associated with the event.

9. The method of claim 8 further comprising converting the latitude and the longitude associated with the event into a zip code associated with the event and wherein the step of determining whether at least a portion of the event information pertains to the user-defined geographic region includes determining whether the zip code associated with the event is located within a predetermined radius of the user-defined zip code.

10. A system for receiving event information in a vehicle comprising:

a receiver configured to receive a broadcast signal containing event information including a geographic location associated with an event;

one or more computers operatively connected with the receiver and configured to store information about an identification number unique to the vehicle;

store information about a user-defined geographic region;

determine whether the event information pertains to the user-defined geographic region;

store the event information if the event information pertains to the user-defined geographic region;

automatically generate an alert signal if the event information pertains to the user-defined geographic region; and at least one of play and display the stored event information.

11. The system of claim 10 wherein the receiver is further configured to receive a broadcast signal containing information about a user-defined geographic region including a broadcast identification number and wherein the one or more computers are further configured to determine whether the identification number unique to the vehicle matches the broadcast identification number thereby determining whether the information about the user-defined geographic region pertains to the vehicle; and store the information about the user-defined geographic region when the identification number unique to the vehicle matches the broadcast identification number.

* * * * *

UNITED STATES PATENT AND TRADEMARK OFFICE

CERTIFICATE OF CORRECTION

PATENT NO. : 7,619,507 B2
APPLICATION NO. : 11/383811
DATED : November 17, 2009
INVENTOR(S) : Santos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 304 days.

Signed and Sealed this

Twenty-sixth Day of October, 2010

David J. Kappos
*Director of the United States Patent and Trademark Office*